(12) United States Patent
Lection et al.

(10) Patent No.: US 10,963,279 B2
(45) Date of Patent: Mar. 30, 2021

(54) HOST-SUBORDINATE COMPUTING DEVICE ADMINISTRATION AND CONTROL USING A HOST VIRTUAL MACHINE MANAGER

(71) Applicant: International Business Machines Corporation, Armonk, NY (US)

(72) Inventors: David B. Lection, Raleigh, NC (US); Ruthie D. Lyle, Durham, NC (US); Eric L. Masselle, Wake Forest, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 226 days.

(21) Appl. No.: 14/985,633

(22) Filed: Dec. 31, 2015

(65) Prior Publication Data
US 2017/0192807 A1    Jul. 6, 2017

(51) Int. Cl.
*G06F 9/455* (2018.01)

(52) U.S. Cl.
CPC .. *G06F 9/45558* (2013.01); *G06F 2009/4557* (2013.01); *G06F 2009/45566* (2013.01); *G06F 2009/45595* (2013.01)

(58) Field of Classification Search
CPC ....... G06F 9/4445; G06F 9/453; H04L 63/10; H04L 67/141
See application file for complete search history.

(56) References Cited

U.S. PATENT DOCUMENTS

| | | | | |
|---|---|---|---|---|
| 8,296,763 B1* | 10/2012 | Peercy | .................... | H04L 63/10 713/161 |
| 8,583,920 B1* | 11/2013 | Bursell | .................... | G06F 21/44 713/164 |
| 8,612,641 B1* | 12/2013 | Bozarth | ................ | G06F 3/0227 710/15 |
| 9,348,636 B2* | 5/2016 | Khajuria | .............. | G06F 9/45558 |
| 2005/0091359 A1* | 4/2005 | Soin | ........................ | G09G 5/006 709/223 |

(Continued)

OTHER PUBLICATIONS

"TestiPhone.com—iPhone Application Web Based Simulator," http://testiphone.com/ (retrieved Jun. 19, 2017), 2007, 2 pages.

(Continued)

*Primary Examiner* — Lewis A Bullock, Jr.
*Assistant Examiner* — Gilles R Kepnang
(74) *Attorney, Agent, or Firm* — Cantor Colburn LLP; Samuel Waldbaum

(57) ABSTRACT

Embodiments are directed to a computer implemented method of controlling a host computing device connected to at least one subordinate computing device. The method includes configuring a host virtual machine manager (VMM) of the host computing device to perform a method that includes deploying an instance of a subordinate virtual machine (VM) on the subordinate computing device, and deploying another instance of the subordinate VM on the host computing device. The method further includes administering features or functions of the instance of the subordinate VM on the subordinate computing device, and administering features or functions of the another instance of the subordinate VM on the host computing device.

3 Claims, 4 Drawing Sheets

(56) References Cited

U.S. PATENT DOCUMENTS

| | | | |
|---|---|---|---|
| 2007/0016682 A1* | 1/2007 | Hodgson | H04M 1/72522 709/228 |
| 2010/0146504 A1* | 6/2010 | Tang | G06F 9/45537 718/1 |
| 2011/0202977 A1* | 8/2011 | Ohno | G06F 21/305 726/4 |
| 2012/0159144 A1* | 6/2012 | Sengupta | H04B 1/3883 713/100 |
| 2012/0311578 A1* | 12/2012 | Hara | G06F 9/4445 718/1 |
| 2013/0065569 A1* | 3/2013 | Leipzig | G06F 9/453 455/416 |
| 2013/0086202 A1* | 4/2013 | Connelly | G06F 9/45558 709/217 |
| 2013/0117741 A1* | 5/2013 | Prabhakaran | G06F 9/455 718/1 |
| 2013/0143527 A1 | 6/2013 | Randazzo et al. | |
| 2013/0232485 A1* | 9/2013 | Murray | G06F 9/4445 718/1 |
| 2013/0254369 A1 | 9/2013 | Rogel et al. | |
| 2013/0291062 A1* | 10/2013 | Bursell | H04L 63/08 726/4 |
| 2013/0326072 A1* | 12/2013 | Smyth | H04L 67/141 709/227 |
| 2014/0130042 A1* | 5/2014 | Luxenberg | G06F 9/4445 718/1 |
| 2014/0365971 A1* | 12/2014 | Laadan | H04W 4/18 715/835 |
| 2015/0067045 A1* | 3/2015 | Bharadwaj Shamarao Venkata Rao | H04L 65/4038 709/204 |
| 2016/0036963 A1* | 2/2016 | Lee | G06F 9/445 455/418 |
| 2016/0124499 A1* | 5/2016 | Shiu | G06F 3/011 715/778 |
| 2017/0168862 A1* | 6/2017 | Yocam | G06F 9/45558 |
| 2017/0308414 A1* | 10/2017 | Wu | G06F 9/4843 |

OTHER PUBLICATIONS

My Spy (mSpy), "mSpy™ Cell Phone Tracker App," https://www.mspy.com/ (retrieved Jun. 19, 2017), 2017, 3 pages.

* cited by examiner

HOST-SUBORDINATE COMPUTING DEVICE ADMINISTRATION AND CONTROL USING A HOST VIRTUAL MACHINE MANAGER

BACKGROUND

The present disclosure relates in general to the administration and control of connected computing devices. More specifically, the present disclosure relates to systems and methodologies for administering and controlling host-subordinate connected computing devices using virtual machines.

In computing, a virtual machine (VM) is an operating system (OS) or application environment installed on software that imitates dedicated hardware. The end user has the same experience using a VM as they would have using a standard OS on dedicated hardware. Specialized software called a hypervisor or a virtual machine manager (VMM) emulates the client/server CPU, memory, hard disk, network and other hardware resources completely. This enables the VMM to emulate multiple virtual hardware platforms that are isolated from each other, thus allowing multiple different VMs to run multiple different OSs on the same underlying physical host. Because a VM uses physical hardware more efficiently, it is often implemented in large, multiple-server computing environments to reduce the amount of required physical hardware, which lowers hardware and associated maintenance costs and reduces power and cooling demands.

Mobile virtualization is the implementation of VMs on mobile computing devices such as smartphones, connected wireless computing devices, tablets, laptops and the like. With mobile virtualization, mobile smartphones can support multiple domains/OSs on the same smartphone hardware. For example, an employee may have one mobile smartphone for work and a separate mobile smartphone for personal use. Mobile virtualization allows a single mobile device to be configured to support a VM instance of the employee's work mobile device and a separate VM instance of the employee's personal mobile device. The mobile device's VMM can be segmented such that the employer's IT department can securely administer the work VM, and the employee can separately administer the personal VM.

In some connected computing environments, it is impractical to separately administer VMs. For example, when the connected computing devices are multiple mobile smartphones operating under a family plan of a mobile communications carrier, there is a need for greater coordination in their administration. Currently, the administration of smartphones in a family plan typically reverts to the wireless carrier's web site. Some wireless carriers allow only the account owner to administer the functions and features of each mobile smartphone in the account. Other wireless carriers allow each member of the account to administer some functions and features.

It can be time consuming, inconvenient and inefficient to access a web site to administer the functions and features of connected mobile computing devices. Accordingly, there is a need for systems and methodologies for relatively quick, convenient and efficient administration of connected mobile computing devices.

SUMMARY

Embodiments are directed to a computer implemented method of controlling a host computing device connected to at least one subordinate computing device. The method includes configuring a host virtual machine manager (VMM) of the host computing device to perform a method that includes deploying an instance of a subordinate virtual machine (VM) to the subordinate computing device, and deploying another instance of the subordinate VM on the host computing device. The method further includes administering features or functions of the instance of the subordinate VM on the subordinate computing device, and administering features or functions of the another instance of the subordinate VM on the host computing device.

Embodiments are further directed to a computer system for controlling a host computing device connected to at least one subordinate computing device. The system includes a host VMM of the host computing device configured to perform a method that includes deploying an instance of the subordinate VM on the subordinate computing device, and deploying another instance of the subordinate VM on the host computing device. The method further includes administering features or functions of the instance of the subordinate VM on the subordinate computing device, and administering features or functions of the another instance of the subordinate VM on the host computing device.

Embodiments are further directed to a computer program product for controlling a host computing device connected to at least one subordinate computing device. The computer program product includes a computer readable storage medium having program instructions embodied therewith, wherein the computer readable storage medium is not a transitory signal per se. The program instructions are readable by a processor system to cause the processor system to perform a method. The method performed by the processor system includes configuring a host VMM of the host computing device to perform a method. The method includes deploying an instance of a subordinate VM on the subordinate computing device, and deploying another instance of the subordinate VM on the host computing device. The method further includes administering features or functions of the instance of the subordinate VM on the subordinate computing device, and administering features or functions of the another instance of the subordinate VM on the host computing device.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present disclosure is particularly pointed out and distinctly claimed in the claims at the conclusion of the specification. The foregoing and other features and advantages are apparent from the following detailed description taken in conjunction with the accompanying drawings in which:

Figure 1:
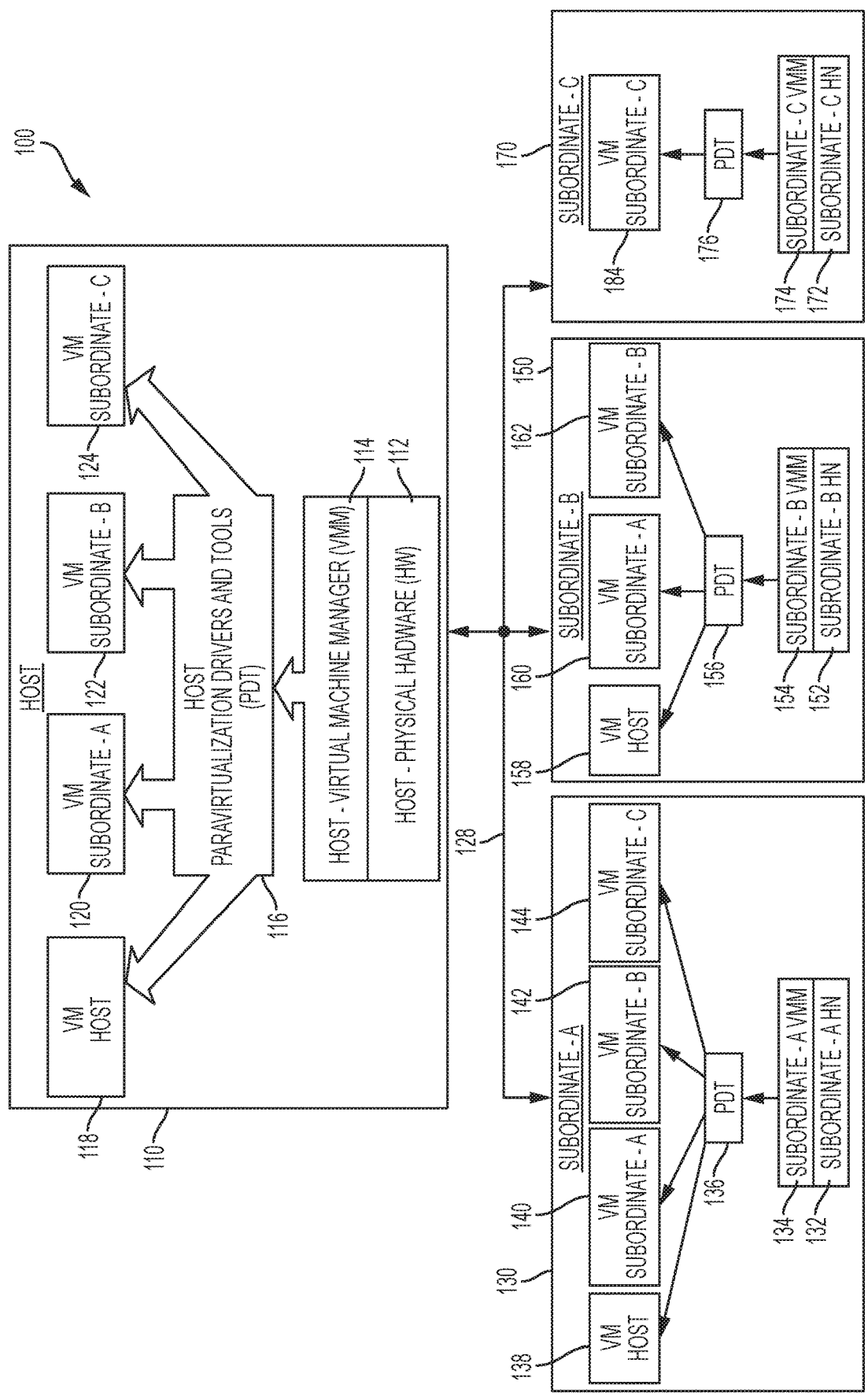
FIG. 1 depicts an exemplary host-subordinate connected computing system capable of implementing one or more embodiments.

In the accompanying figures and following detailed description of the disclosed embodiments, the various elements illustrated in the figures are provided with three or four digit reference numbers. The leftmost digit(s) of each reference number corresponds to the figure in which its element is first illustrated.

DETAILED DESCRIPTION

Various embodiments of the present disclosure will now be described with reference to the related drawings. Alternate embodiments may be devised without departing from the scope of this disclosure. It is noted that various connections are set forth between elements in the following description and in the drawings. These connections, unless specified otherwise, may be direct or indirect, and the present disclosure is not intended to be limiting in this respect. Accordingly, a coupling of entities may refer to either a direct or an indirect connection.

Additionally, although this disclosure includes a detailed description of a mobile smartphone type of connected computing environment implemented through a wireless mobile carrier, implementation of the teachings recited herein are not limited to a particular type or configuration of connected mobile computing devices. Rather, embodiments of the present disclosure are capable of being implemented in conjunction with any other type or configuration of wireless or hard-wired connected computing devices and/or connecting computing environments, now known or later developed.

Turning now to an overview of the present disclosure, one or more embodiments of the present disclosure provide systems and methodologies for administering and controlling a configuration of host-subordinate connected computing devices using VMs. The host computing device and the subordinate computing devices include a variety of types of computing devices, including but not limited to mobile computing devices such as a smartphone, a smartwatch, a tablet computer, a laptop computer, etc., as well as stationary computing devices such as a desktop computer, a mainframe and the like. The disclosed connected configuration includes a host computing device and at least one subordinate computing device. A host VMM of the host computing device is configured to administer other subordinate computing devices of the configuration, and also configured to allow an instance of the VM of each subordinate computing device to run concurrently in the host computing device.

The host VMM is further configured to propagate changes made to the functions and features of any instance of a VM in the configuration to any computing device in the configuration on which an instance of that VM is resident. For example, in a simple configuration having a host computing device and one connected subordinate computing device, if the host VMM changes a feature of the instance of the subordinate VM resident on the host, the host VMM propagates that change to the instance of the subordinate VM resident on the subordinate. If a subordinate computing device changes any of its VM functions or features, these changes are immediately propagated to the VM instance of that subordinate computing device running on the host computing device, or running on any other subordinate computing device in the configuration. In this manner, the features and functions of the subordinate VM instance resident on the host computing device are maintained in synchronization with the features and functions of the subordinate VM instance resident on any of the subordinate computing devices. The host VMM is further configured to provide switching functionality, wherein a host computing device or a subordinate computing device so-enabled by the host computing device can switch modes so that its controlling OS is any one of the VM instances resident on the host or subordinate computing device.

Turning now to a more detailed description of the present disclosure, FIG. 1 depicts an exemplary host-subordinate computing system 100 capable of implementing one or more embodiments. System 100 includes a host computing device 110, a subordinate-A computing device 130, a subordinate-B computing device 150, a subordinate-C computing device 170 and a communications path 128, configured and arranged as shown. Communications path 128 can be implemented in a variety of known wireless or non-wireless formats. An instance of every subordinate VM in system 100 is resident on host computing device 110, but the selection of which VM instances are resident on any one subordinate computing device is a design choice. System 100 depicts a non-limiting example of one option for selecting the VM instances that are resident on subordinate-A computing device 130, subordinate-B computing device 150 and subordinate-C computing device 170.

Host computing device 110 includes a host physical hardware (HW) circuit 112, a host VMM module 114, a host paravirtualization drivers and tools (PDT) module 116, a host VM instance 118, a subordinate-A VM instance 120, a subordinate-B VM instance 122 and a subordinate-C VM instance 124, configured and arranged as shown. Subordinate-A computing device 130 includes a subordinate-A physical HW circuit 132, a subordinate-A VMM module 134, a subordinate-A PDT module 136, a host VM instance 138, a subordinate-A VM instance 140, a subordinate-B VM instance 142 and a subordinate-C VM instance 144, configured and arranged as shown. Subordinate-B computing device 150 includes a subordinate-B physical HW circuit 152, a subordinate-B VMM module 154, a subordinate-B PDT module 156, a host VM instance 158, a subordinate-A VM instance 160 and a subordinate-B VM instance 162, configured and arranged as shown. Subordinate-C computing device 170 includes a subordinate-C physical HW circuit 172, a subordinate-C VMM module 174, a subordinate-C PDT module 176 and a subordinate-C VM instance 184, configured and arranged as shown.

Figure 3:
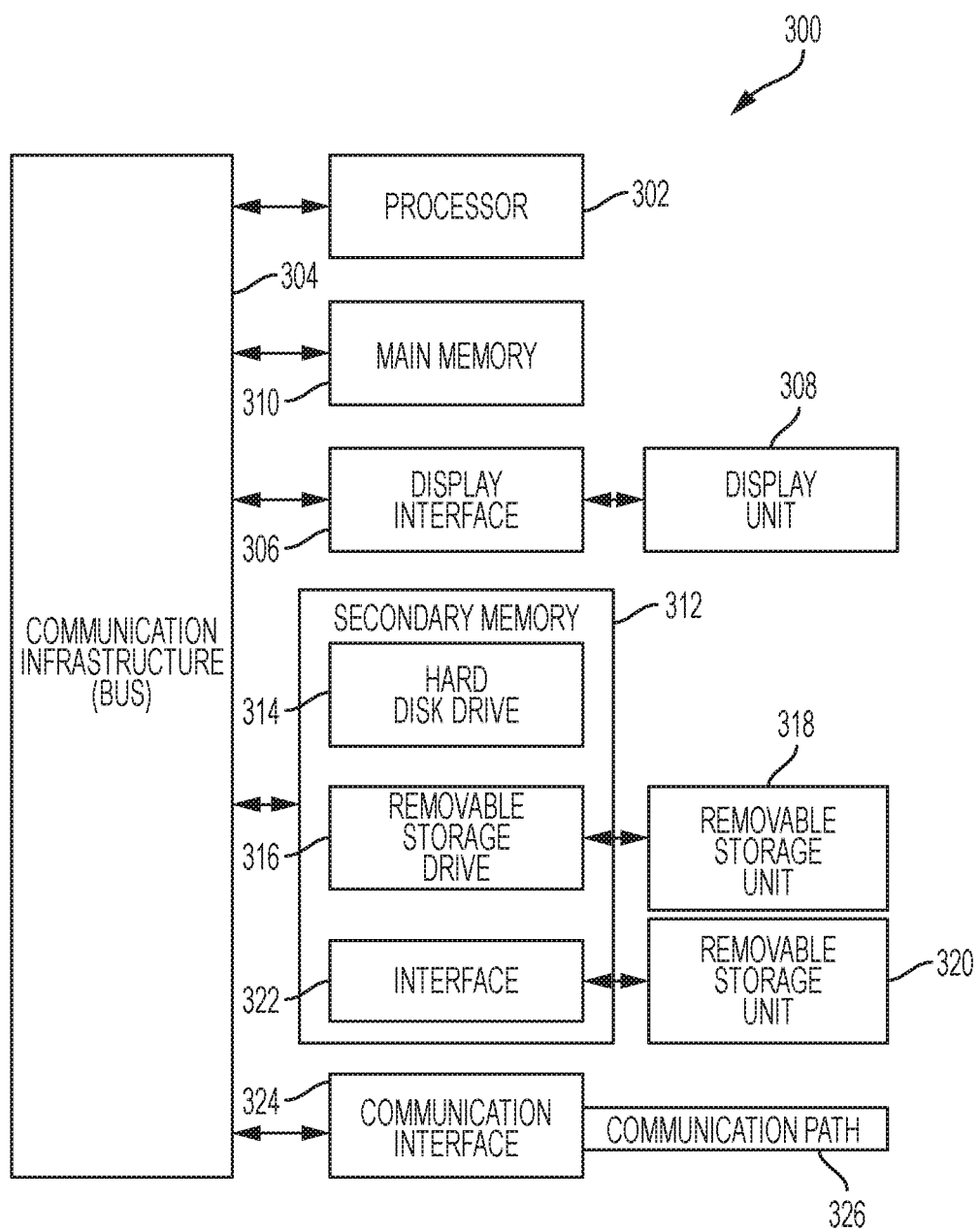
FIG. 3 depicts an exemplary computer system capable of implementing portions of the host-subordinate connected computing system shown in FIG. 1.

Turning now to a more detailed description of host computing device, 110, host physical HW circuit 112 includes a processor system and memory circuits on which host VMM module 114 runs. A detailed example of a computer system 300 capable of implementing host physical HW 112 is shown in FIG. 3 and described later in this disclosure. Host VMM module 114 is known as a type I hypervisor configuration because host VMM module 114 is installed directly on host physical HW 112. In a type II hypervisor configuration, a standard OS is installed directly on host physical HW 112, and host VMM 114 would be loaded on top of the standard OS. After host VM instance 118, subordinate-A VM instance 120, subordinate-B VM instance 122 and subordinate-C VM instance 124 are installed on top of host VMM module 114, host PDT module 116 is installed between VM instances 118, 120, 122, 124 and host VMM module 114. Host PDT module 116 is a set of tools that provide operations and drivers for VM instances 118, 120, 122, 124 to run more optimally.

Subordinate-A computing device 130, subordinate-B computing device 150 and subordinate-C computing device 170 include substantially the same physical HW, PDT and VM components as described above for host computing device 110. However, the VMMs of host computing device 110, subordinate-A computing device 130, subordinate-B computing device 150 and subordinate-C computing device 170 operate differently. More specifically, according to the present disclosure, host VMM module 114 is superior to VMM modules 134, 154, 174 of subordinate computing devices 130, 150, 170, respectively. Further according to the present disclosure, host VMM module 114 controls subordinate-A computing device 130, subordinate-B computing device 150 and subordinate-C computing device 170 through their respective VMM modules 134, 154, 174 to provide configuration, deployment, administration and switching functionality of each VM in system 100.

Figure 2:
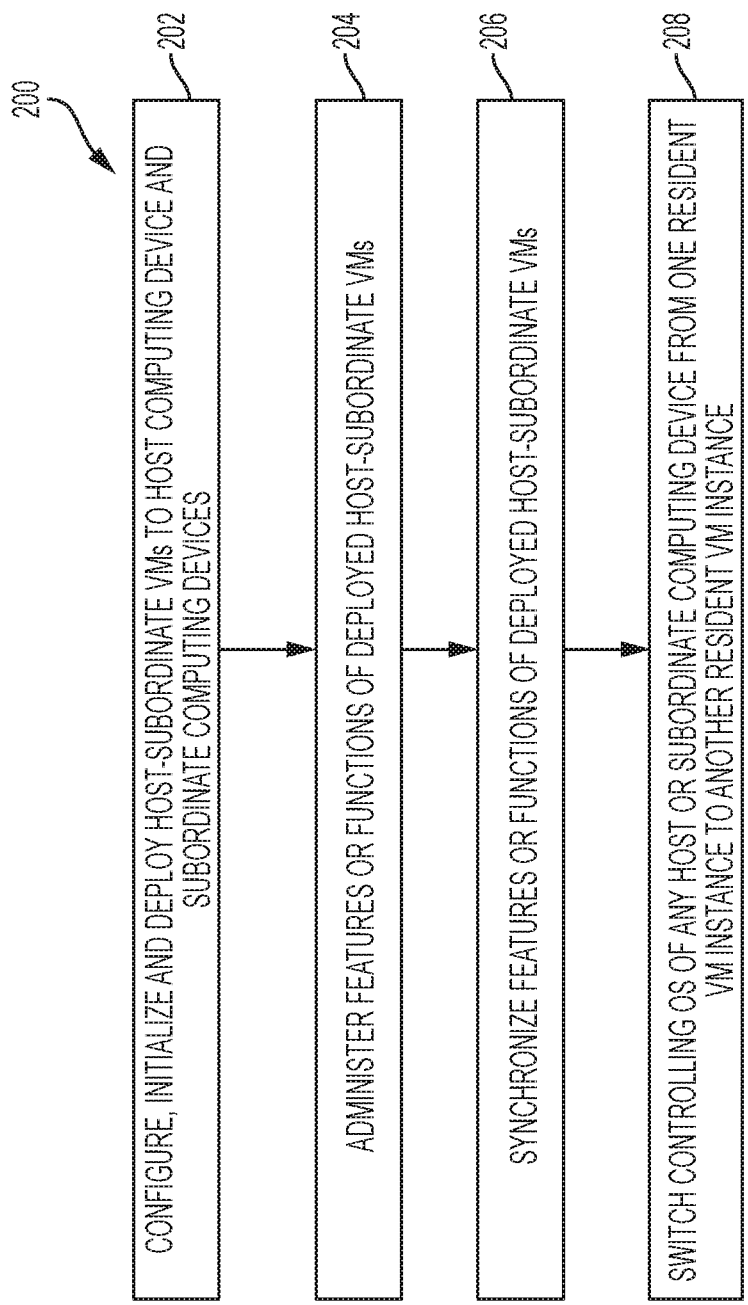
FIG. 2 depicts a flow diagram illustrating a methodology according to one or more embodiments.

FIG. 2 depicts a flow diagram illustrating a methodology 200 in accordance with the present disclosure. More specifically, methodology 200 depicts operations performed by system 100 shown in FIG. 1 according to one or more embodiments. The operations of system 100 are described below with reference to both methodology 200 shown in FIG. 2 and system 100 shown in FIG. 1. Host VMM module 114 of host computing device 110 is configured to initialize and configure host VM instance 118, subordinate-A VM instance 120, subordinate-B VM instance 122 and subordinate-C VM instance 124 (block 202). Host VMM module 114 is further configured to initialize, configure and deploy host VM instance 138, subordinate-A VM instances 140, 160, subordinate-B VM instances 142, 162 and subordinate-C VM instances 144, 184 to subordinate-A computing device 130, subordinate-B computing device 150 and subordinate-C computing device 170 according to a desired VM distribution plan (block 202). According to the present disclosure, although an instance of every subordinate VM in system 100 is resident on host computing device 110, the selection of which VM instances are resident on any one subordinate computing device is a design choice. System 100 depicts a non-limiting example of one option for selecting the VM instances that are resident on subordinate-A computing device 130, subordinate-B computing device 150 and subordinate-C computing device 170.

Host VMM module 114 of host computer 110 is further configured to administer the functions and features of subordinate-A computing device 130, subordinate-B computing device 150 and subordinate-C computing device 170 (block 204). An example of how host VMM module 114 according to the present disclosure administers the features and functions of host and subordinate computing devices in system 100 includes the following. Where system 100 is a configuration of mobile smartphones operating under a wireless carrier's family plan, a host smartphone VMM may be configured to divide the resources of the wireless carrier family plan among the host smartphone and the subordinate smartphones. For example, assume the host smartphone is capable of 4G data rates, and the plan has 4G data enabled. If each subordinate smartphone is only capable of 3G data rates, the host smartphone VMM limits subordinate smartphones to 3G data rates, even though the host smartphone is capable of running any VM instance resident on the host smartphone at 4G data rates. If any subordinate smartphone is upgraded to 4G service, the host smartphone VMM will allocate 4G data speeds to the upgraded smartphone. The same virtualized administration techniques of the present disclosure can be applied to the administration of available minutes, text messages and other features and functions.

Host VMM module 114 of host computing device 110 is further configured to propagate changes made to the functions and features of any instance of a VM to any of subordinate-A computing device 130, subordinate-B computing device 150 or subordinate-C computing device 170 on which the VM instance is resident (block 206). For example, if host VMM module 114 changes a feature or function of subordinate-C VM instance 124 resident on host computing device 110, host VMM module 114 propagates that change to subordinate-C VM instance 184 that is resident on subordinate-C computing device 170. In one or more embodiments, host VMM module 114 may grant certain change permissions to subordinate-A VMM module 134, subordinate-B VMM module 154 and subordinate-C VMM module 174. If subordinate-A VMM module 134, subordinate-B VMM module 154 and subordinate-C VMM module 174 change any of their functions or features, these changes are immediately propagated to the VM instance of that subordinate computing device running on host computing device 110, or running on any other subordinate computing device in system 100 where the changed VM instance is resident. In this manner, the features and functions of host VM instance 118, subordinate-A VM instance 120, subordinate-B VM instance 122 and subordinate-C VM instance 124 resident on host computing device 110 are maintained in synchronization with the features and functions of host VM instance 138, subordinate-A VM instances 140, 160, subordinate-B VM instance 142, 162 and subordinate-C VM instance 184 resident on one, some or all of subordinate-A computing device 130, subordinate-B computing device 150 and subordinate-C computing device 170.

Host VMM module 114 of host computer 110 is further configured to provide switching functionality, which allows host computing device 110 (or any other subordinate computing device so enabled by host VMM module 114) to switch between running host VM instance 118 as its controlling OS or running any one of its resident subordinate VM instances 120, 122, 124 as its controlling OS (block 208). Host VMM module 114 is further configured to initiate switching functionality in different ways in response to different stimuli. As an example, where system 100 is a configuration of mobile smartphones operating under a wireless carrier's family plan, a host smartphone VMM may be configured to issue a notification through the host smartphone that a call is coming into a particular subordinate smartphone (e.g., by a special ring tone associated with the particular smartphone), and further configured to automatically switch the controlling OS of the host smartphone to the subordinate smartphone VM instance resident on the host smartphone if the subordinate smartphone has not responded to the phone call after a certain number of rings. When the host smartphone VMM switches the controlling host OS to the subordinate smartphone VM instance resident on the host smartphone, the physical controls functions, features and screen of the host smartphone are now mapped as they would be on the subordinate smartphone.

In another example of VMM switching according to the present disclosure, a father and son are watching television in a downstairs living room. The father's smartphone is on a table in the living room, and the son's smartphone is in his bedroom upstairs. The father's smartphone is the host smartphone under their wireless family plan, and the son's smartphone is a subordinate smartphone under their wireless family plan. Both smartphones are configured to operate according to the present disclosure. A friend places a phone call to the son's smartphone, which triggers a notification through the subordinate VM instance of the son's smartphone resident on the father's smartphone that a phone call is coming into the son's smartphone. Rather than rushing upstairs to take the call, missing the call, or allowing the call to go to voicemail, the host VMM of the father's host smartphone could switch the controlling OS of the host smartphone over to the subordinate smartphone VMM instance of the son's smartphone that is resident on the host smartphone, and the son could use his father's phone to answer a call placed to the son's smartphone.

FIG. 3 depicts a high level block diagram computer system 300, which may be used to implement one or more embodiments of the present disclosure. More specifically, computer system 300 may be used to implement hardware components of host computing device 110, subordinate-A computing device 130, subordinate-B computing device 150 and subordinate-C computing device 170 shown in FIG. 1. Although one exemplary computer system 300 is shown, computer system 300 includes a communication path 326, which connects computer system 300 to additional systems (not depicted) and may include one or more wide area networks (WANs) and/or local area networks (LANs) such as the Internet, intranet(s), and/or wireless communication network(s). Computer system 300 and additional system are in communication via communication path 326, e.g., to communicate data between them.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In alternative embodiments, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310 and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Thus it can be seen from the foregoing detailed description that the present disclosure provides a number of technical benefits. One or more embodiments of the present disclosure provide systems and methodologies for relatively quick, convenient and efficient administration of connected mobile computing devices. The present disclosure administers and controls a configuration of host-subordinate connected computing devices using VMs. The disclosed connected configuration includes a host computing device and at least one subordinate computing device. A VMM of the host computing device is configured to administer other subordinate computing devices of the configuration, and also configured to allow a VM for each subordinate computing device to run concurrently in the host computing device. The host VMM is further configured to propagate changes made to the functions and features of any instance of a VM in the configuration to any computing device in the configuration on which an instance of the VM is resident. The host VMM is further configured to provide switching functionality, wherein a host computing device, or a subordinate computing device so-enabled by the host computing device, can switch its controlling OS to any one of the VM instances resident on the computing device.

Figure 4:
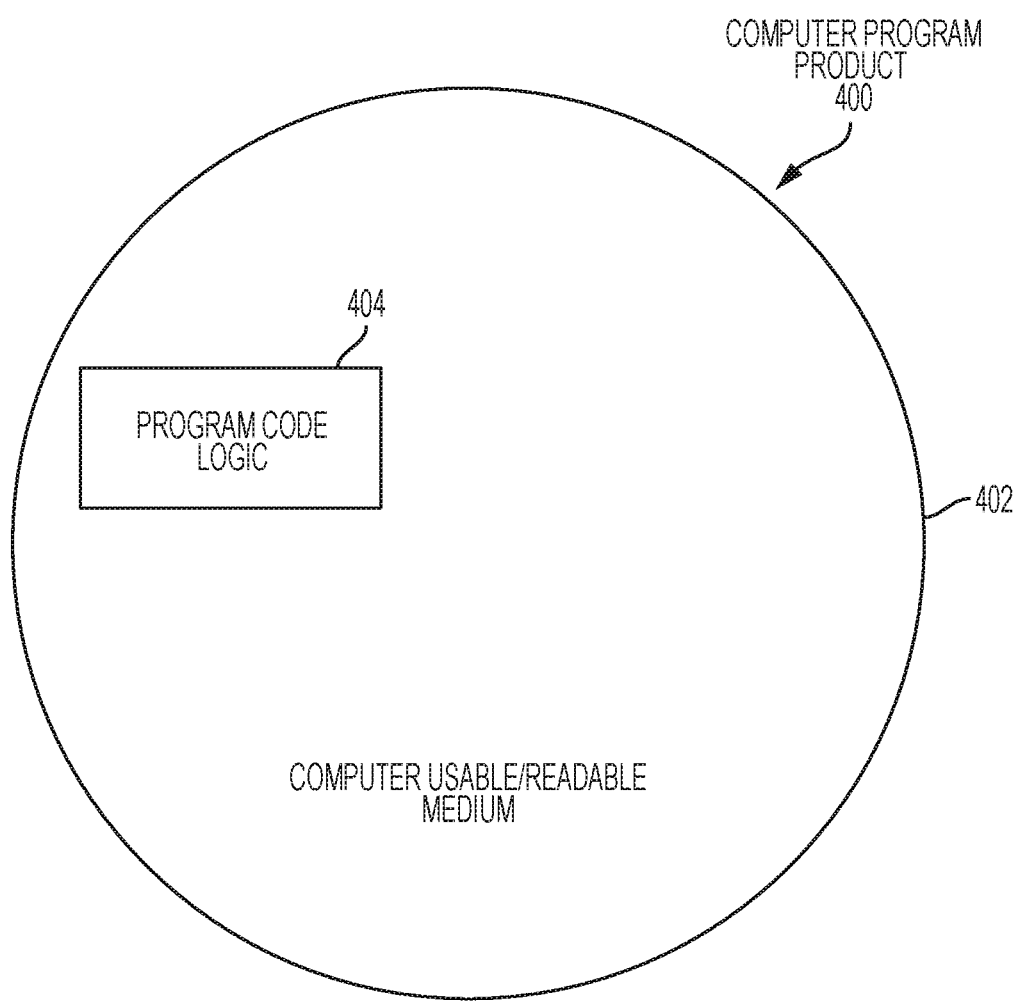
FIG. 4 depicts a computer program product in accordance with one or more embodiments.

Referring now to FIG. 4, a computer program product 400 in accordance with an embodiment that includes a computer readable storage medium 402 and program instructions 404 is generally shown.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

It will be understood that those skilled in the art, both now and in the future, may make various improvements and enhancements which fall within the scope of the claims which follow.

What is claimed is:

1. A computer implemented method of controlling a host computing device connected to a subordinate computing device, the method comprising:
  initializing, using a host virtual machine manager (VMM) of the host computing device, a subordinate virtual machine (VM) configured to function as a simulation of an operating system (OS) of the subordinate computing device;
  initializing, using the host VMM of the host computing device, a host VM configured to function as a simulation of an OS of the host computing device, wherein the host computing device comprises a first smartphone and wherein the subordinate computing device comprises a second smartphone;
  subsequent to initializing both the host VM and the subordinate VM, using the host computing device to perform further operations comprising:
    initializing a second instance of the subordinate VM on the host computing device;
    deploying the second instance of the subordinate VM on the subordinate computing device; and
    synchronizing administration of the features or the functions of the second instance of subordinate VM deployed on the subordinate computing device and the subordinate VM deployed on the host computing device by performing synchronization operations comprising:
      administering a first change to the features or the functions of the second instance of the subordinate VM deployed on the subordinate computing device;
      automatically propagating the first change to the features or the functions of the second instance of the subordinate VM deployed on the subordinate computing device to the subordinate VM deployed on the host computing device;
      administering a second change to the features or the functions of the subordinate VM deployed on the host computing device; and
      automatically propagating the second change to the features or the functions of the subordinate VM deployed on the host computing device to the second instance of the subordinate VM deployed on the subordinate computing device;
    wherein a type of the first change administered to the features or the functions of the second instance of the subordinate VM deployed on the subordinate computing device is based on a capability of the subordinate computing device;
    wherein a type of the first change propagated to the subordinate VM deployed on the host computing device is based on a capability of the host computing device;
    wherein a type of the second change administered to the features or the functions of the subordinate VM deployed on the host computing device is based on the capability of the host computing device; and
    wherein a type of the second change propagated to the second instance of the subordinate VM deployed on the subordinate computing device is based on the capability of the subordinate computing device; and
  responsive to the performing of the synchronization operations, further performing, by the first smartphone, a switching operation comprising:
    during the synchronized administration of the features or the functions of the second instance of the subordinate VM deployed on the subordinate computing device with the subordinate VM deployed on the host computing device, receiving a notification at the first smartphone that a phone call is coming into the second smartphone; and
    based at least in part on a determination that the second smartphone has not answered the phone call within a predetermined time after the phone call came into the second smartphone, automatically switching a controlling OS of the first smartphone from the host VM to the subordinate VM deployed on the first smartphone.

2. A computer system for controlling a host computing device connected to a subordinate computing device, the system comprising:
  a host virtual machine manager (VMM) of the host computing device configured to perform a method comprising:
    initializing, using the host VMM of the host computing device, a subordinate virtual machine (VM) configured to function as a simulation of an operating system (OS) of the subordinate computing device;
    initializing, using the host VMM of the host computing device, a host VM configured to function as a simulation of an OS of the host computing device, wherein the host computing device comprises a first smartphone and wherein the subordinate computing device comprises a second smartphone;
    subsequent to initializing both the host VM and the subordinate VM, using the host computing device to perform further operations comprising;
      initializing a second instance of the subordinate VM on the host computing device;
      deploying the second instance of the subordinate VM on the subordinate computing device; and
      synchronizing administration of the features or the functions of the second instance of subordinate VM deployed on the subordinate computing device and the subordinate VM deployed on the host computing device by performing synchronization operations comprising;
        administering a first change to the features or the functions of the second instance of the subordinate VM deployed on the subordinate computing device;
        automatically propagating the first change to the features or the functions of the second instance of the subordinate VM deployed on the subordinate computing device to the subordinate VM deployed on the host computing device;
        administering a second change to the features or the functions of the subordinate VM deployed on the host computing device; and
        automatically propagating the second change to the features or the functions of the subordinate VM deployed on the host computing device to the second instance of the subordinate VM deployed on the subordinate computing device;
      wherein a type of the first change administered to the features or the functions of the second instance of the subordinate VM deployed on the subordinate computing device is based on a capability of the subordinate computing device;
      wherein a type of the first change propagated to the subordinate VM deployed on the host computing device is based on a capability of the host computing device;

wherein a type of the second change administered to the features or the functions of the subordinate VM deployed on the host computing device is based on the capability of the host computing device; and wherein a type of the second change propagated to the second instance of the subordinate VM deployed on the subordinate computing device is based on the capability of the subordinate computing device; and responsive to the performing of the synchronization operations, further performing, by the first smartphone, a switching operation comprising:

during the synchronized administration of the features or the functions of the second instance of the subordinate VM deployed on the subordinate computing device with the subordinate VM deployed on the host computing device, receiving a notification at the first smartphone that a phone call is coming into the second smartphone; and based at least in part on a determination that the second smartphone has not answered the phone call within a predetermined time after the phone call came into the second smartphone, automatically switching a controlling OS of the first smartphone from the host VM to the subordinate VM deployed on the first smartphone.

3. A computer program product for controlling a host computing device connected to a subordinate computing device, the computer program product comprising a computer readable storage medium having program instructions embodied therewith, wherein the computer readable storage medium is not a transitory signal per se, the program instructions readable by a processor system to cause the processor system to perform a method comprising configuring a host virtual machine manager (VMM) of the host computing device to perform a method comprising:

initializing, using a host virtual machine manager (VMM) of the host computing device, a subordinate virtual machine (VM) configured to function as a simulation of an operating system (OS) of the subordinate computing device;

initializing, using the host VMM of the host computing device, a host VM configured to function as a simulation of an OS of the host computing device, wherein the host computing device comprises a first smartphone and wherein the subordinate computing device comprises a second smartphone;

subsequent to initializing both the host VM and the subordinate VM, using the host computing device to perform further operations comprising:

initializing a second instance of the subordinate VM on the host computing device;

deploying the second instance of the subordinate VM on the subordinate computing device; and synchronizing administration of the features or the functions of the second instance of subordinate VM deployed on the subordinate computing device and the subordinate VM deployed on the host computing device by performing synchronization operations comprising:

administering a first change to the features or the functions of the second instance of the subordinate VM deployed on the subordinate computing device;

automatically propagating the first change to the features or the functions of the second instance of the subordinate VM deployed on the subordinate computing device to the subordinate VM deployed on the host computing device;

administering a second change to the features or the functions of the subordinate VM deployed on the host computing device; and automatically propagating the second change to the features or the functions of the subordinate VM deployed on the host computing device to the second instance of the subordinate VM deployed on the subordinate computing device;

wherein a type of the first change administered to the features or the functions of the second instance of the subordinate VM deployed on the subordinate computing device is based on a capability of the subordinate computing device;

wherein a type of the first change propagated to the subordinate VM deployed on the host computing device is based on a capability of the host computing device;

wherein a type of the second change administered to the features or the functions of the subordinate VM deployed on the host computing device is based on the capability of the host computing device; and wherein a type of the second change propagated to the second instance of the subordinate VM deployed on the subordinate computing device is based on the capability of the subordinate computing device; and responsive to the performing of the synchronization operations, further performing, by the first smartphone, a switching operation comprising:

during the synchronized administration of the features or the functions of the second instance of the subordinate VM deployed on the subordinate computing device with the subordinate VM deployed on the host computing device, receiving a notification at the first smartphone that a phone call is coming into the second smartphone; and based at least in part on a determination that the second smartphone has not answered the phone call within a predetermined time after the phone call came into the second smartphone, automatically switching a controlling OS of the first smartphone from the host VM to the subordinate VM deployed on the first smartphone.

* * * * *